Aug. 23, 1932.   C. WILHJELM   1,873,091
TEMPERATURE CONTROL APPARATUS
Filed Nov. 28, 1930
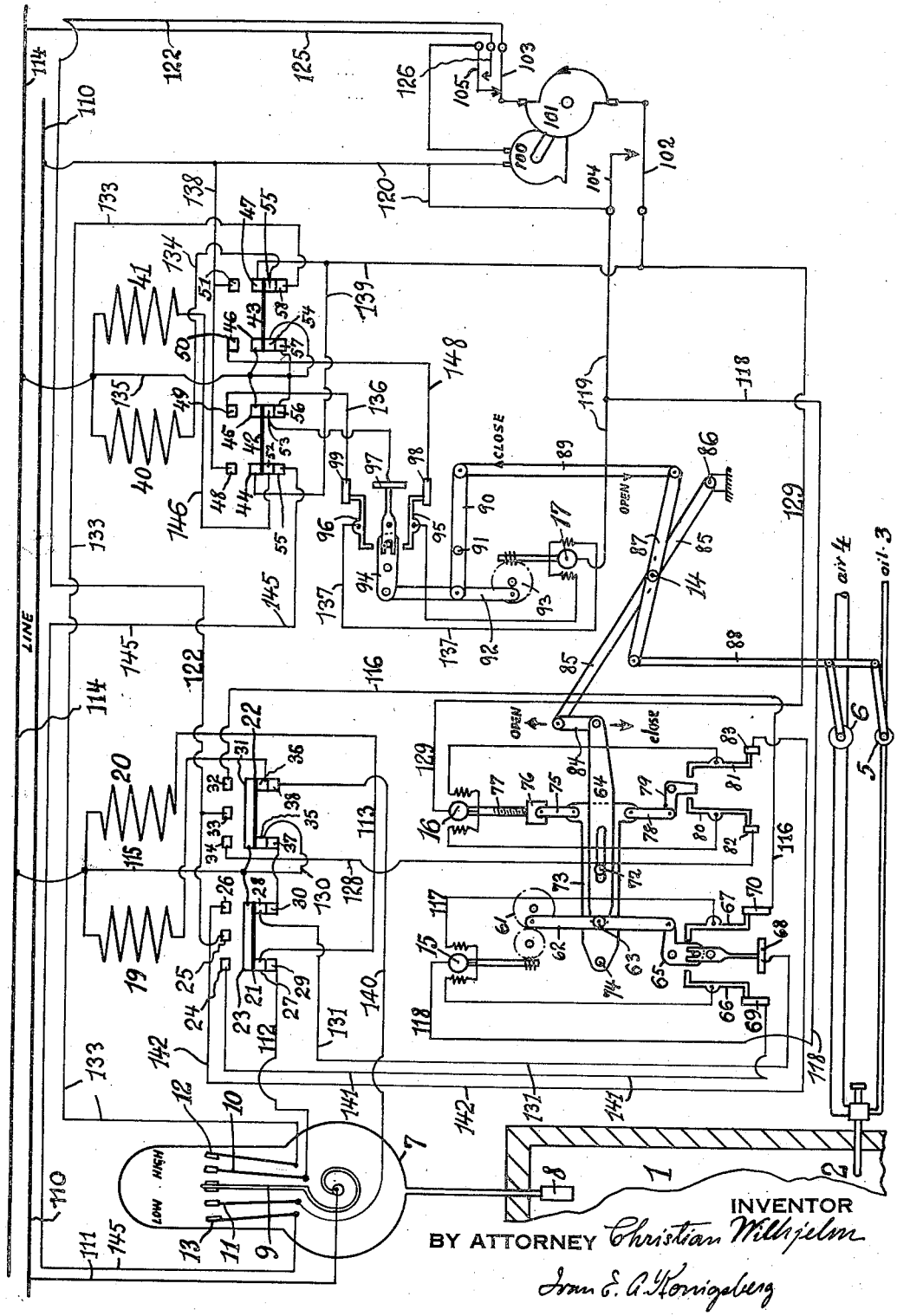
INVENTOR
Christian Wilhjelm
BY ATTORNEY
Ivan E. A. Konigsberg Patented Aug. 23, 1932

1,873,091

UNITED STATES PATENT OFFICE

CHRISTIAN WILHJELM, OF PHILADELPHIA, PENNSYLVANIA

TEMPERATURE CONTROL APPARATUS

Application filed November 28, 1930. Serial No. 498,901.

The object of this invention is to provide an improved system and apparatus for controlling and regulating conditions in which temperature, flow, pressures, dimensions or other matters, things or elements enter as factors to be governed, regulated, operated or controlled in order to maintain a desirable or normal working or operating condition.

Many attempts, more or less successful, have been made to solve the ever increasing problems of maintaining a desired condition in different arts and industries by means of suitable regulating or controlling mechanisms and apparatus, more or less automatic in function or operation. As a general proposition this invention is not particularly concerned with controlling conditions for which other existing prior art disclosures suffice. This invention, though applicable in such instances, is particularly concerned with the regulation of conditions in which the factor of an unusual or considerable length of time of reaction to the operations of controlling mechanisms must necessarily be considered.

Coming down to a particular instance, selected solely for the sake of illustration and example and not as a limitation of the applicability of this invention, the regulation or control of the temperature within an oil and gas fired furnace will be considered in the following discussion and description of this invention.

Where the operating conditions of a furnace is such that a considerable time lag is an unavoidable factor in the reaction to the operations of the controlling devices for maintaining an even or desirable working temperature within the furnace, improved means or combinations of known devices are necessary and desirable in order to cause the correcting measures to become effective in a manner to overcome or compensate for the time lag.

This latter item is well known in the art of temperature or other control. It simply means that a change in conditions, in this case the temperature, occurs sometime before or after corrective measures have been taken to maintain the desired normal condition or temperature. As a consequence, the effect of the corrective measures are not observable soon enough on the instruments which are employed to react and register the changed condition or temperature, and which in turn cause the correcting instrumentalities to function.

The corrective mechanisms, therefore, lag behind in their operations with the result that still further and usually more extensive operations are necessary to compensate for lost time. It is a particular object of this invention to provide novel apparatus for use under conditions requiring means to compensate for considerable time lag or like disturbing factor.

The accompanying drawing is a diagrammatical illustration of an apparatus and electric wiring diagram embodying a novel combination of devices for regulating and controlling the temperature in a furnace in which the factor of a considerable time lag must be considered and compensated for. The invention however, will function equally well if the time lag is not abnormally large.

Referring to the drawing the reference numeral 1 denotes a furnace heated by a burner 2 supplied with oil and air, for instance, through pipes 3 and 4 respectively and controlled by valves 5 and 6. The furnace is provided with a thermometer 7 having a gas filled bulb 8 extending into the furnace. The thermometer has a pointer 9 adapted to engage two contacts 10 and 11 when the changes in the temperature are relatively slight.

When the changes range beyond allowable limits, the pointer contacts with two additional contacts 12 and 13. When this occurs special measures must be taken to bring the temperature back to normal and to prevent further variations.

This is accomplished by first giving the valves an initial movement to vary the fuel supply. If the initial movement suffices, nothing further happens and the valves are moved back to original positions. If the movement is not sufficient, then the valves are operated still further, step by step, until they have been moved into new positions in which the fuel supply balances the fuel requirement.

If now the time lag of the furnace is such that these valve operations are insufficient, then means are set in operation for causing an extensive valve movement to control such an abnormal sudden change in temperature, or the change in conditions may become uncontrollable.

The initial movement of the valves is caused by an initial motor 15. The second balancing movement is caused by a balancing motor 16. The third—or time lag compensating movement as it were—is caused by a third motor 17. The operations of the motors are governed by certain relays and other circuit operating devices to be hereafter described in detail.

Numerals 19 and 20 denote two relays having armatures 21 and 22 respectively. Armature 21 has a top contact 23 adapted to bridge three contacts 24, 25 and 26. It also has bottom contacts 27 and 28 adapted to engage contacts 29 and 30. All contacts, terminals and like electrical elements are of course properly insulated.

The armature 22 has a top contact 31 for bridging the three contacts 32, 33 and 34. It also has two bottom contacts 35 and 36 adapted to engage contacts 37 and 38. The relays 19 and 20 are energized to pull up their respective armatures 21 and 22 when the temperature increases.

There are two other similar relays 40 and 41 which operate armatures 42 and 43 respectively. Armature 42 has top contacts 44 and 45 adapted to engage contacts 48 and 49. It also carries bottom contacts 52 and 53 adapted to engage contacts 55 and 56. Armature 43 has top contacts 46 and 47 for engagement with contacts 50 and 51, and bottom contacts 54 and 55 adapted to engage contacts 57 and 58.

The initial motor 15 is suitably geared to operate a crank disk 61 to which is pivoted one end of a lever 62 which in turn is pivoted at 63 to a main arm 64. The other end of the lever is pivoted to a bell crank 65 adapted to actuate limit switch levers 66 and 67 and a third position lever 68. 69 and 70 are fixed terminals or contacts. The main arm 64 is pivoted on a floating adjustable pivot 72 carried by a base 73 having a fixed pivot 74. The base is movable on its pivot by means of a link 75 pivotally connected to a nut 76 which in turn is operated by a screw shaft 77 actuated by the balancing motor 16. To the base 73 is also connected a link 78 for operating another limit switch contact bell crank 79. The latter is adapted to operate the limit contact levers 80 and 81 with respect to fixed terminals 82 and 83.

The free end of the arm 64 is connected by a link 84 to a lever 85 having a fixed base pivot 86. At 14 the lever 85 is pivotally connected to another lever 87 which by a link 88 operates the valves 5 and 6 in an obvious manner. The lever 87 is at its other end connected to a link 89 pivoted to an arm 90 which is pivoted at 91. The arm 90 is swung on its pivot by a link 92 operated by a crank disk 93 from the third motor 17.

Here again we have a limit switch device in that the link 92 operates an arm 94 to actuate limit switch levers 95 and 96 with respect to two fixed terminals 98 and 99. 97 is a third switch contact in the limit switch device and is also operated by the arm 94.

Finally, there is a motor 100 for operating an interruptor 101 in the form of a cam adapted to operate movable switch terminals 102 and 103 with respect to fixed terminals 104 and 105 respectively.

The operation is as follows: When the temperature is at the desired normal point within the furnace, the parts remain in the positions shown in the drawing. If the temperature increases slightly or to some extent depending upon the local conditions, thermometer pointer 9 will engage contact 10 thereby closing a circuit to energize relay 20 as follows.

From the line wire 110 via wire 111, pointer 9, contact 10, wire 112, contacts 29—27, wire 113, relay 20 and back to the other line wire 114. The relay is energized and pulls up its armature 22 causing three different circuits to be made as follows.

First, an initial motor circuit via line 114, wire 115, armature contact 31, contact 32, wire 116, limit switch contacts 70—67, wire 117, the motor 15 and out through wires 118, 119, 120 to line 110. This circuit starts the motor 15 to move crank disk in a clockwise direction, thereby pulling up link 62 to operate bell crank 65 to engage lever 67 and break the motor circuit at 67—70. At the same time it will be noted from the drawing, the third contact 68 is swung over to engage fixed terminal 69.

However, when the link 62 moves upward it pulls up pivot 63 and swings the arm 64 on its pivot 72 causing the arm to move the link 84 downward and depress or rather operate lever 85, whereupon of course lever 87 is also operated and through link 88 gives the valves a first initial definite closing movement. The terms upward, downward, right and left are used with respect to the positions shown in the drawing. At this time therefore, the valves have been closed somewhat and the motor 15 is now stopped.

Second, an interruptor circuit is made as follows. From armature contact 31 via contact 33, wire 122, terminals 103—105, to motor 100 and out through wire 120. The motor 100 starts and operates interruptor 101. The latter turns anti-clockwise and immediately breaks the circuit through motor 100. The latter however, continues to run because when terminal 103 drops away from terminal 105—either by gravity or by means of a spring, not shown—the motor circuit is remade via line 114, wire 125, terminals 126—105—the latter dropping down upon 126—and through the motor.

Here it should be noted that if the interruptor 101 is in the position shown, the circuit through terminal 126 is broken so that the motor 100 cannot start until the said second interruptor circuit is made via the relay 20. The auxiliary circuit for motor 100 via terminal 126 is to insure the operation of the interruptor motor 100 until the interruptor 101 stops in the position shown, because if pointer 9 moves away from contact 10 while the interruptor is not in the position shown, the relay circuit through relay 20 will be broken at 103—105 and the circuit through motor 15 will also be broken.

The interruptor also breaks contacts at terminals 102 and 104. In practice, the speed of the interruptor is such that terminals 102—104 are closed once in a time lag period. If it takes, say two minutes before a change in the fuel supply affects a thermometer reading, the interruptor speed must be such that contacts 102—104 close once every two minutes.

Third, a balancing circuit is made via armature contact 31, contact 34, wire 128, limit switch contacts 82—80, balancing motor 16 wire 129, terminals 102—104 (if these are closed) and out through wire 120. Motor 16 starts to rotate shaft 77 to move the nut 76, link 75 and the base 73 downward, the latter swinging on pivot 74. But this movement also carries the sliding pivot 72 downward causing main arm 64 to be still further depressed and thus operate the levers 85 and 87 to still further close the valves.

The balancing movement of the valves just described is a step by step movement because of the interruptions in the balancing motor circuit at the terminals 102—104.

If now the initial closing movement plus the balancing step by step closing movements of the valves have been sufficient to bring the temperature back to normal, then pointer 9 will break with contact 10 and the relay circuit 20 will be broken. However, the valves cannot be permitted to remain in their more-closed positions because obviously the fuel supply is now less than is required. Provision is therefore made to open the valves again by means of a fourth circuit as follows.

When the relay 20 is deenergized, the armature 22 will drop establishing a fourth circuit as follows:

From the line 114 via wires 115 and 130, contacts 35—37 across to contacts 30—28, wire 131, contacts 68—69—66 to motor 15 and out through wire 118 as before. Motor 15 therefore starts running but in the opposite direction and moves the link 62 back to the position shown, also actuating bell crank 65 back to normal position and the said fourth circuit is broken at 68—69 as is obvious. The downward movement of link 62 swings the main arm 64 in a direction which raises the link 84 to actuate levers 85 and 87 to open the valves.

The net result of these valve movements is that the initial closing movement has been counteracted by an almost equal opening movement, so that the valves have been opened only to an extent equal to the sum of the small step by step closing movements. In practice this has the twofold advantage that the initial closing movement prevents the temperature from exceeding certain limits, and when the temperature turns back, the motor 15 is caused to move the valves back to almost normal positions thereby checking the tendency towards a decrease in temperature. In most cases the small balancing movements of the valves are sufficient to hold the temperature within the desired normal zone or range, the operation of the initial motor 15 being chiefly for the purpose of checking the tendency to overshoot.

Assuming now that the temperature increase is such that the pointer 9 moves over and connects with contact 12 via contact 10, then a circuit is made through relay 40 as follows. From line 110 via wire 111, elements 9—10—12, wire 133, contacts 58—55, wire 134, relay 40 and out to the line 114. Consequently the relay 40 is energized to pull up armature 42 establishing two circuits as follows.

One circuit, from line 114 via wire 135, contacts 45—49, wire 136, limit switch 99—96, wire 137 to motor 17 and out via 119—120, starts the motor 17 to operate crank disk 93 anticlockwise, thereby actuating the parts 92—90—89 to operate lever 87 anticlockwise to close the valves still further. This movement takes place quickly to stop the abnormal temperature increase. The movement of the link 92 of course also operates arm 94 to break the motor circuit at limit switch contacts 96—99 and moves contact 97 over against contact 98.

Another circuit is made from line 110, via wires 120—138, contacts 48—44, wires 139—129 to balancing motor 16 and out. The balancing motor will therefore run continuously regardless whether the interruptor makes or breaks contacts at the terminals 102 and 104, these latter being short circuited by the circuit just described through motor 16. The latter will therefore operate as before and move the valves continuously toward fully closed position, the closing movements being extra and in addition to the closing movements described above.

The temperature will now decrease, the pointer 9 will move back and contact will be broken between 10 and 12. Thus the circuit through relay 40 is broken, the armature 42 drops and the two circuits to motors 17 and 16 are broken. The former condition is now restored in which the motor 16 is run stepwise to close the valves by way of the interruptor, terminals 102—104 being no longer short circuited.

The dropping of the armature 42 establishes a new circuit as follows. From line 114 via wire 135 to contacts 54—57, across to contacts 56—53 to contacts 97—98—95, to motor 17 and out.

This starts motor 17 in the opposite direction to open the valves a distance equal to first additional closing movement caused by motor 17. The motor 17 runs of course till its circuit is broken at 97—98 by the downward movement of the link 92. The opening of the valves prevents overshooting when the temperature is again going back to normal.

As the temperature gradually approaches normal, the circuits will be broken at 9 and 10 as before and motor 15 will move its associated parts back to normal position and normal conditions will be restored.

When the temperature decreases the parts will operate opposite to that described for the increase and the circuits will be described briefly as follows. When the pointer 9 engages contact 11, the relay 19 is energized via wire 140 and contacts 38—36. Hence armature 21 is pulled up and establishes three circuits as follows.

First to motor 15 via contacts 23—24, wire 141 and limit switch contacts 69—66 and then out. The motor 15 will start to operate to open the valves.

Second to the motor 16 via contacts 23—26, wire 142 and contacts 83—81 and the motor 16 operates stepwise to open the valves.

Third, to the interruptor motor via contacts 23—25 and wire 122 as before. And of course the interruptor operates the same as before to actuate motor 16. The result of these operations is that the valves are first initially opened and then step by step opened to check the decrease of the temperature after which contact is broken at 9 and 11. Then the armature 21 drops and establishes a circuit via contacts 30—28, wire 131 and through the limit switch at 68 to operate the motor 15 to close the valves a distance equal to their first opening.

If the decrease in temperature continues, contacts are made at 9—11—13 and the relay 41 is energized via wire 145, contacts 53—52 and wire 146. Armature 43 is pulled up and one circuit is made to the motor 17 via contacts 43—46 and wire 148, while another circuit is made to motor 16 via contacts 51—47 to wire 139 as before. The result of these operations are of course that the valves are opened and again closed in exactly the same manner in which they were first closed and then opened on the plus side, and it seems unnecessary to recapitulate the detailed operations.

The main advantage of the invention is that it is possible to give the valves very great movements when the conditions change suddenly or threaten to go beyond control. The great movements are however compensated for or cut down promptly as soon as the danger is past.

I claim:—

1. In an apparatus for temperature control, the combination of means to determine variations from a given temperature, a plurality of electric motors for controlling the flow of a temperature modifying medium to maintain the given temperature including two motors to apply corrections while the temperature variations remain within a given range and another motor to apply corrections when the variations exceed said given range of variations.

2. In an apparatus for temperature control, the combination of means for determining variations from a given temperature, a mechanism for controlling the flow of a temperature modifying medium to maintain the given temperature, said mechanism comprising two interconnected controls to apply corrections while the temperature variations remain within a given range and an additional control to apply additional corrections when the variations exceed said given range of variations.

3. In an apparatus for temperature control, the combination of means for determining variations from a given temperature, a mechanism for controlling the flow of a temperature modifying medium to maintain the given temperature, said mechanism comprising two interconnected motors to apply corrections while the temperature variations remain within a given range and an additional motor to apply additional corrections when the variations exceed said given range of variations.

4. The combination with a furnace and a valve for controlling the fuel supply thereto, of an electric circuit, two motors in said circuit for operating the valve, a timing device in the circuit, means for closing the circuit to actuate one of the motors to operate the valve in immediate response to changes in temperature within the furnace and to actuate the timing device, means operated by the latter for actuating the other motor to operate the valve in the event the said first operation thereof has been insufficient to correct the said temperature change and means in said circuit for actuating said first named motor to operate the valves in the opposite direction a distance substantially equal to the first operation of the valve.

5. The combination with a furnace and a valve for controlling the fuel supply thereto, of valve operating means comprising a first motor for operating the valve in response to temperature changes in the furnace within a given range of variations, and a second motor for similarly operating the valve in immediate response to temperature changes of greater magnitude than the variations aforesaid, a balancing motor for similar stepwise and further operation of the valve subsequent to the operations of the valve by either of the said two first named motors and electric circuits for actuating the motors.

Signed at Philadelphia in the county of Philadelphia and State of Pennsylvania this twenty-fifth day of November A. D. 1930.

CHRISTIAN WILHJELM.